United States Patent
Bytnar et al.

(10) Patent No.: US 7,947,193 B2
(45) Date of Patent: May 24, 2011

(54) ANTICORROSION AGENTS FOR HALIDE BRINES

(75) Inventors: Stephen C. Bytnar, Greeley, CO (US); Joshua Joe'l Trujillo, Greeley, CO (US)

(73) Assignee: Envirotech Services, Inc., Greeley, CO (US)

( * ) Notice: Subject to any disclaimer, the term of this patent is extended or adjusted under 35 U.S.C. 154(b) by 381 days.

(21) Appl. No.: 12/172,008

(22) Filed: Jul. 11, 2008

(65) Prior Publication Data

US 2010/0009073 A1 Jan. 14, 2010

(51) Int. Cl.
*C09K 3/18* (2006.01)
*C23F 11/00* (2006.01)
*C23F 15/00* (2006.01)

(52) U.S. Cl. ...... 252/70; 106/13; 106/14.15; 106/14.44; 427/421.1

(58) Field of Classification Search .................... 252/70; 106/13, 14.15, 14.44; 427/421.1
See application file for complete search history.

(56) References Cited

U.S. PATENT DOCUMENTS

| | | | |
|---|---|---|---|
| 5,302,307 A | 4/1994 | Ireland | |
| 5,641,352 A * | 6/1997 | Jeknavorian et al. | 106/808 |
| 5,891,225 A | 4/1999 | Mishra et al. | |
| 6,468,913 B1 * | 10/2002 | Pasqualoni et al. | 438/693 |

* cited by examiner

*Primary Examiner* — Anthony J Green
(74) *Attorney, Agent, or Firm* — Kilpatrick Townsend & Stockton LLP

(57) ABSTRACT

Halide brine solutions that contain a dissolved salt of an alkali metal halide or alkali earth metal halide, and an anticorrosion agent comprising an alcohol diglycinate are described. The halide brine solutions may be used to treat transportation surfaces for deicing, anti-freezing, and dust suppression, among other applications. For example, methods of treating a transportation surface with a deicing composition to slow the formation of ice and snow on the surface are described. These methods may include providing the deicing composition that includes an aqueous solution of magnesium chloride, and an ethanoldiglycinate disodium salt. The deicing composition may be sprayed on the transportation surface in an amount effective to slow the formation of ice and snow on the surface.

19 Claims, No Drawings

ANTICORROSION AGENTS FOR HALIDE BRINES

FIELD

The field includes aqueous halide salt solutions that also include an anticorrosion agent to reduce the corrosion rate of the solution compared with aqueous halide brines that lack the agent. Embodiments of the anticorrosion agent may include alcohol diglycinates. The field also includes methods of making and using the solutions to, for example, suppress the formation of ice and snow, and/or control the generation of dust from a surface.

BACKGROUND

Powdered and aqueous salt solutions find many applications in the transportation industry. Powdered salts such as sodium chloride and magnesium chloride, as well as aqueous brines of these salts, can be applied to roads, bridges, and other transport surfaces to suppress the formation and accumulation of snow and ice. Aqueous salt brines are also used for dust control on paved and unpaved roads, especially where dry and windy weather conditions are prevalent. These solutions may also be applied to exposed surfaces of loads of dirt, gravel, coal, and other dust producing materials as they are being transported.

Unfortunately, halide salts can cause severe corrosion in many materials, including the metals used in vehicles and reinforced concrete. This corrosion not only increases the costs of vehicle maintenance and repair, but also creates safety hazards such as deteriorating concrete, broken bolts and fasteners, and rusting rail lines. The cumulative impact of these problems has caused many states to limit the use of salt on roads.

One alternative has been to sand, gravel, and other abrasives instead of halide salts to reduce effects of snow and ice on roads. While these materials may not substantially lower the freezing temperature of water like halide salts, they can increase the coefficient of friction between the road and vehicle tires. However, sand and gravel can also cause significant property damage when particulates are kicked up by fast moving vehicles. Dents in vehicle paneling and cracks in vehicle windshields are common occurrences when sand and gravel have been applied on a highway or other high-speed road. The use of sand and abrasives has also been proven to contribute to air and waterway pollution.

Another alternative has been to add corrosion inhibitors to halide brines in order to reduce the corrosive effects of the halide salts. These corrosion inhibitors have included chromates, phosphates, zinc salts, and nitrites. Unfortunately, all of these corrosion inhibitors have side effects that make them less than ideal for transportation applications. For example, while the nitrites may reduce the corrosive effects of halide salts across large surface areas, they may actually increase the rate of localized spot corrosion, rapidly increasing perforation in metals. Corrosion inhibitors that use salts of transition metals like chromium and zinc have raised environmental concerns due to their potential toxicity. Phosphates also raise environmental concerns due, among other reasons, to their unpredictable effects on plant and algae growth. Thus, there is a need for new anticorrosion agents that can be mixed with halide salts to significantly reduce the corrosive effects of those salts. This and other problems are addressed below.

BRIEF SUMMARY

Halide brine solutions are described that include diglycinate anticorrosion agents that significantly reduce the rate of corrosion of the solution compared with similar solutions that lack the agent. Halide brines with the anticorrosion agents remain effective anti-freezing/anti-icing and dust control solutions, but with substantially reduced corrosion causing properties.

Embodiments of the invention include an anti-icing solution that includes a dissolved salt of an alkali metal halide or alkali earth metal halide, and an anticorrosion agent that includes an alcohol diglycinate. The alcohol diglycinate may be present in a amount that reduces the corrosion rate by about 70% or more compared with a similar anti-icing solution that does not include an anticorrosion agent.

Embodiments of the invention also include methods of treating a surface with a halide brine, where the halide brine has reduced corrosion effects. The methods may include the step of providing a solution having a dissolved salt of alkali metal halide or alkali earth metal halide, and an anticorrosion agent comprising an alcohol diglycinate. The methods may also include applying the solution to the surface. The surface may be treated to prevent or slow the formation of ice and/or snow, or to control the amount of dust blown off the surface, among other applications. The alcohol diglycinate may be present in the solution in an amount that reduces the corrosion rate by about 70% or more compared with a similar solution of NaCl that does not include an anticorrosion agent.

Embodiments of the invention may further include methods of treating a transportation surface with a deicing composition to slow the formation of ice and snow on the surface. The methods may include the step of providing a deicing composition that is an aqueous solution of magnesium chloride, which also includes an ethanoldiglycinate disodium salt. The methods may further include spraying the deicing composition to the transportation surface in an amount effective to slow the formation of ice and snow on the surface. The ethanoldiglycinate disodium salt acts as an anticorrosion agent that slows corrosion rate of materials, especially metals, that come in contact with the aqueous magnesium chloride. The ethanoldiglycinate disodium salt may be added to the deicing composition in an amount effective to slow the rate of corrosion by about 70% or more compared with an aqueous solution having the same concentration of sodium chloride.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION

Halide brines are described that include aqueous solutions of a halide salt and a diglycinate anticorrosion agent. These low-corrosion halide brines may be used as anti-freezing/anti-icing compounds, and/or dust control compounds, among other applications.

The diglycinate anticorrosion agent may have Formula I:

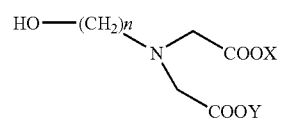

where n may be an integer whole number from 1 to 5, and X and Y are, independently, alkali metal cations. Specific examples of Formula I compounds include alcohol diglycinate dihalide salts such as methanoldiglycinate disodium salt, ethanoldiglycinate disodium salt, propanoldiglycinate disodium salt, isopropanoldiglycinate disodium salt, butanoldiglycinate disodium salt, isobutanoldiglycinate disodium salt, methanoldiglycinate dipotassium salt, ethanoldiglycinate dipotassium salt, propanoldiglycinate dipotassium salt, isopropanoldiglycinate dipotassium salt, butanoldiglycinate dipotassium salt, isobutanoldiglycinate dipotassium salt. Embodiments may also include salts analogous to Formula I, where one or both alkali metal cations X and Y are replaced by hydrogen ions to make a carboxylic acid group.

The halide brines may also include one or more halide anions such as fluoride, chloride, bromide, iodide ions. The brines may also include one or more cations such as an alkali metal cation (e.g., lithium, sodium, potassium, rubidium, etc.) and/or an alkali earth metal cation (e.g., magnesium, calcium, strontium, barium, etc.). The halide salts dissolved in water to make the aqueous brine solution may include sodium chloride, calcium chloride, and/or magnesium chloride, among other salts.

The concentration of the halide salt and anticorrosion agent in the aqueous solution may be such that the corrosion rate is about 50% less, 60% less, 70% less, 80% less, 90% less, etc., than a NaCl brine solution that lacks the anticorrosion agent. The concentration of the halide salt in the aqueous solution may be, by wt., about 10%, 20%, 30%, 40%, 50%, 60%, 70%, etc. The concentration of the diglycinate anticorrosion agent in the aqueous solution may be, by vol., about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, etc.

Corrosion Tests

Tests measuring the efficacy of an exemplary anticorrosion agent in an exemplary halide brine were performed. These tests varied the concentration of ethanoldiglycinate disodium salt in a 30% $MgCl_2$ aqueous brine solution while measuring the solutions rate of corrosion. The test results showed that after the addition of only 0.4%, by vol., of a 27.5% ethanoldiglycinate disodium salt solution to an aqueous $MgCl_2$ brine the corrosion rate was reduced by 70% compared to a similar 30% $MgCl_2$ brine that lacked the diglycinate anticorrosion agent. Adding 1.5%, by vol., of the ethanoldiglycinate disodium salt solution reduced the corrosion rate by about 90%.

The corrosion tests were performed in accordance with the National Association of Corrosion (NACE) Standard TM-01-69, as modified by the Washington State Department of Transportation (WSDOT) Deicer test Procedures set in the fall of 1995. The tests were carried out at room temperature, and distilled water and 95% pure $MgCl_2$ were used in each test to establish the standard.

The tests included preparation of steel coupons upon which the aqueous brine was applied. The coupons used in the tests were ½ inch (approximately 1 inch O.D.×½ inch I.D.×1/10 inch thick) flat steel washers. The coupons were all of the same batch to eliminate this factor as a variable in the testing results. Prior to application of the brine solution, each coupon was cleaned and dried with a solved to remove oils, and then sandblasted. Three coupons were used for each test solution, as well as for the pure water and pure 30% $MgCl_2$ solution used in the controls. Each set of three coupons was marked with an identifier to distinguish it from the other sets.

The surface area of each coupon was calculated using the formula:

$$A = \pi/2(D^2 - d^2) + \pi tD + \pi td$$

where "D" is the outside diameter of the washer, "d" is the inside diameter of the washer, and "t" is the thickness of the washer. Inches are used as the dimensional units for all three variables in the formula.

The aqueous brine solutions were prepared by first mixing the powdered $MgCl_2$ salt into a volume of distilled water to make a 30% $MgCl_2$ brine. Then various volumes incrementally ranging between 0.4% and 1.5%, by vol., of a 27.5%, by wt., aqueous solution of ethanoldiglycinate disodium salt was added to samples of the $MgCl_2$ brine to make the test solutions.

Approximately 300 mL of each test solution was held in a 500 mL Erlenmeyer flask, which was equipped with a rubber stopper having a hole through which a line could be run. One end of the line was attached to a frame made to hold coupons inside the flask, and the other end of the line was attached to a bar. The bar was lowered and raised using a pneumatic system. The system was arranged such that the bar was lowered for 10 minutes and then raised for 50 minutes. This allowed the coupons to be exposed to the test solution for 10 minutes each hour. The test was conducted for 72 hours.

At the end of the test, the coupons were removed the solution and placed in a cleaning solution composed of concentrated hydrochloric acid solution containing 50 g/L of stannous chloride ($SnCl_2$) and 50 g/L of antimony chloride ($SbCl_3$). After about 15 minutes of cleaning, the coupons were removed from the cleaning acid, rinsed with deionized water, and wiped with a cloth to clean any deposits from the coupons. They were then returned to the hydrochloric acid solution and cleaned again. Finally, they were rinsed, dried and weighed.

The weight loss of each coupon was determined by subtracting the final weight from the original weight. The corrosion rate was calculated as mils of penetration per year (MPY) by the following formula:

$$MPY = \frac{\text{Weight Loss (mg)} \times 534}{\text{Area (in2)} \times \text{Time} \times \text{Density (mg/in3)}}$$

The metal density was taken to be 7.45 for the steel washers. The corrosion rate for each solution was the mean of the three individual coupons exposed to the brine solution. The results mean result was then normalized on a 100 point scale with 0 points representing the corrosion rate for the pure deionized water solvent and 100 points representing the corrosion rate for a pure 30% $MgCl_2$ brine with no anticorrosion agent added. Table 1 lists the percentage reduction in the corrosion rate compared with the NaCl brine for various concentrations of the ethanoldiglycinate disodium salt:

TABLE 1

Percentage Change in Corrosion Reduction Rate As a Function of Ethanoldiglycinate Disodium Concentration for Aqueous $MgCl_2$ Brines:

| Ethanoldiglycinate Disodium Concentration in $MgCl_2$ Brine (as % Volume) | Percentage Reduction in Rate of Corrosion Compared to NaCl Brine |
|---|---|
| 0.1% | 61% |
| 0.2% | 63% |
| 0.3% | 66% |
| 0.4% | 70% |
| 0.5% | 74% |
| 0.6% | 76% |
| 0.7% | 78% |
| 0.8% | 79% |

TABLE 1-continued

Percentage Change in Corrosion Reduction Rate As a Function of Ethanoldiglycinate Disodium Concentration for Aqueous MgCl₂ Brines:

| Ethanoldiglycinate Disodium Concentration in MgCl₂ Brine (as % Volume) | Percentage Reduction in Rate of Corrosion Compared to NaCl Brine |
|---|---|
| 0.9% | 80% |
| 1.0% | 82% |
| 1.1% | 83% |
| 1.2% | 84% |
| 1.3% | 86% |
| 1.4% | 88% |
| 1.5% | 90% |

In many jurisdictions, a corrosion inhibitor must show a rate of corrosion reduction of at least 70% to be considered a corrosion inhibited deicing product. Formulations of the diglycinate anticorrosion agent described here can meet that standard adding as little as 0.4%, by vol., of the agent in an aqueous MgCl₂ brine. Moreover, corrosion rate reductions of 90% are observed with anticorrosion agent concentrations of 1.5%, by vol. These tests demonstrate that the diglycinate anticorrosion agents described here provide substantial improvements in the corrosion effects of aqueous halide brines.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the compound" includes reference to one or more compounds and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. An anti-icing solution comprising:
a dissolved salt comprising magnesium chloride; and
an anticorrosion agent comprising an alcohol diglycinate.

2. The anti-icing solution of claim 1, wherein the alcohol diglycinate has the chemical formula:

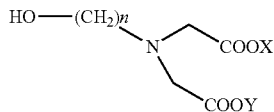

where n=1-5, and X and Y are, independently, alkali metal cations.

3. The anti-icing solution of claim 2, wherein n=2, and X and Y are sodium ions.

4. The anti-icing agent of claim 1, wherein the anticorrosion agent reduces a corrosion rate by about 70% or more compared with an aqueous solution that only contains the dissolved salt.

5. The anti-icing agent of claim 1, wherein the concentration of the dissolved salt of magnesium chloride is about 5% to about 30%, by wt.

6. The anti-icing agent of claim 1, wherein the concentration of the anticorrosion agent in the solution is about 0.1%, by wt., or more.

7. The anti-icing agent of claim 1, wherein the concentration of the anticorrosion agent in the solution is about 0.1% to about 0.5%, by wt.

8. A method of treating a surface with a halide brine having reduced corrosion effects, the method comprising:
providing a solution comprising a dissolved salt of magnesium chloride, and an anticorrosion agent comprising an alcohol diglycinate; and
applying the solution to the surface.

9. The method of claim 8, wherein the solution is applied to the surface in an amount effective to prevent ice formation on the surface.

10. The method of claim 8, wherein the solution is applied to the surface in an amount effective to suppress dust from blowing off the surface.

11. The method of claim 8, wherein the alcohol diglycinate has the chemical formula:

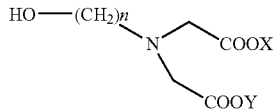

where n=1-5, and X and Y are, independently, alkali metal cations.

12. The method of claim 8, wherein the alcohol diglycinate is a ethanoldiglycinate disodium salt.

13. The method of claim 8, wherein the concentration of the dissolved salt of magnesium chloride in the solution is about 5% to about 30%, by wt.

14. The method of claim 8, wherein the concentration of the anticorrosion agent in the solution is about 0.1%, by wt., or more.

15. The method of claim 8, wherein the concentration of the anticorrosion agent in the solution is about 0.1% to about 0.5%, by wt.

16. A method of treating a transportation surface with a deicing composition to slow the formation of ice and snow on the surface, the method comprising:
providing the deicing composition comprising an aqueous solution of magnesium chloride, and an ethanoldiglycinate disodium salt; and
spraying the deicing composition to the transportation surface in an amount effective to slow the formation of ice and snow on the surface.

17. The method of claim 16, wherein the concentration of the magnesium chloride comprises about 5% to about 30%, by wt, of the aqueous solution.

18. The method of claim 16, wherein the concentration of the ethanoldiglycinate disodium salt comprises about 0.1% to about 0.5%, by wt, of the aqueous solution.

19. The method of claim 16, wherein the deicing composition reduces a corrosion rate by about 70% or more compared with a sodium chloride solution that lacks the ethanoldiglycinate disodium salt.

* * * * *